United States Patent [19]

Luursema et al.

[11] Patent Number: 5,448,139
[45] Date of Patent: Sep. 5, 1995

[54] DISCHARGE LAMP POWER CONTROL CIRCUIT WITH REDUCED LIGHT FLUCTUATIONS DURING LAMP RUN-UP

[75] Inventors: Meerten Luursema, Veldhoven; Nicolaas H. G. Reijnders, Eindhoven, both of Netherlands

[73] Assignee: U. S. Philips Corporation, New York, N.Y.

[21] Appl. No.: 218,793

[22] Filed: Mar. 28, 1994

[30] Foreign Application Priority Data

Apr. 2, 1993 [BE] Belgium ............................. 09300331

[51] Int. Cl.⁶ ........................................... H05B 37/02
[52] U.S. Cl. ..................... 315/308; 315/289; 315/224; 315/DIG. 7
[58] Field of Search ................ 315/308, 291, 307, 82, 315/DIG. 7, 205, 209 R, 219, 289, 127, 224, 289, 290

[56] References Cited

U.S. PATENT DOCUMENTS

| | | | |
|---|---|---|---|
| 5,103,143 | 4/1992 | Daub | 315/308 |
| 5,241,242 | 8/1993 | Daub | 315/82 |
| 5,268,617 | 12/1993 | Daub et al. | 315/82 |

FOREIGN PATENT DOCUMENTS

| | | |
|---|---|---|
| 0443795 | 8/1991 | European Pat. Off. . |
| 0459126 | 12/1991 | European Pat. Off. . |
| 0534280 | 3/1993 | European Pat. Off. . |

Primary Examiner—Robert J. Pascal
Assistant Examiner—Michael B. Shingleton
Attorney, Agent, or Firm—Edward Blocker; Bernard Franzblau

[57] ABSTRACT

A circuit arrangement for operating a high-pressure discharge lamp such that the high-pressure discharge lamp supplies a luminous flux of at least 60% of the nominal luminous flux within 1 s after ignition. The circuit arrangement is made up of a static converter for generating a DC voltage, a commutator provided with lamp connection terminals, a circuit for current stabilization during stable lamp operation by control of the static converter, and a circuit responsive to an instantaneous lamp voltage signal for operating the lamp with an increased run-up current and an increased power as compared with nominal rated operation during a lamp run-up period. A further circuit is provided so that the operation at the increased power includes at least a portion of the lamp run-up period for transition to normal operation. During this portion the increased power has a falling characteristic with a time constant that is independent of lamp voltage.

19 Claims, 2 Drawing Sheets the circuit arrangement comprises
a static converter for generating a DC voltage,
a commutator provided with lamp connection terminals,
means A for current stabilization during stable lamp operation by controlling the static converter, and
means B for operating the lamp with an increased run-up current and an increased power as compared with nominal or normal rated lamp operation and on the basis of an instantaneous lamp voltage signal.

A circuit arrangement of the kind mentioned in the opening paragraph is known, inter alia, from EP-A-443795.

Important types of high-pressure discharge lamps are high-pressure sodium lamps, high-pressure mercury lamps and metal halide lamps. A comparatively high luminous flux immediately after switching-on of the lamp is required, especially when a high-pressure discharge lamp serves as a motorcar headlamp. Metal halide lamps whose discharge vessels contain, inter alia, Xe are particularly suitable for motorcar headlamp applications.

A disadvantage of the known arrangement is that the luminous flux of the lamp after ignition in the case of a cold start exhibits a considerable fluctuation during the run-up of the lamp to a stable operating condition. This fluctuation may amount to more than half of the nominal rated luminous flux under certain circumstances. The occurrence of such a major luminous flux fluctuation is unpleasant both for the user and for the other road users, and may even lead to hazardous traffic situations.

The nominal or rated lamp voltage often lies between 60 V and 110 V in practice. This depends to a high degree on the lamp manufacturing technology.

A reduction of the nominal rated lamp voltage, all other circumstances remaining the same, will lead to an increase in the nominal current, which results in a rise in ohmic losses.

The choice of a higher lamp voltage, all other circumstances remaining the same, in general leads to a greater electrode spacing. This is undesirable particularly for reflector lamps, as in the case of motorcar headlamp systems, because the formation of the illumination beam depends to a high degree on the dimension of the light source, i.e. the discharge path between the electrodes of the discharge lamp.

SUMMARY OF THE INVENTION

It is an object of the invention to restrict the occurrence of a fluctuation in the lamp luminous flux to a considerable degree, while maintaining a lumen output of 60% of the nominal value one second after ignition of a cold lamp. The nominal value of a quantity means the rated value thereof.

A circuit arrangement according to the invention is for this purpose characterized in that the circuit arrangement comprises a transition means C such that the operation at the increased power comprises at least a period for transition to the power for normal lamp operation. During this period the power has a falling characteristic with a time constant that is independent of lamp voltage. It was surprisingly found to be possible to counteract luminous flux fluctuations to a considerable degree by having the final portion of the run-up take place by means of a signal having a falling characteristic with a time constant that is independent of lamp voltage. The choice of the moment may be determined, for example, empirically. Preferably, this moment is determined by the circumstance that the instantaneous lamp voltage reaches a preset limit value.

It was experimentally found that the achievement of a lamp voltage of approximately half the nominal rated value is a suitable limit value. It is preferable, accordingly, to cause the increased power to fall in accordance with the falling characteristic with a time constant independent of lamp voltage from the moment this level of lamp voltage is reached. Preferably, the means C comprise a timer circuit for realising a fixed time constant as the lamp voltage independent time constant. Further improvement is possible in that the means C are provided with two timer circuits with mutually differing fixed time constants.

BRIEF DESCRIPTION OF THE DRAWINGS

These and other aspects of the invention will be explained in more detail with reference to the accompanying drawing in which.

DESCRIPTION OF THE PREFERRED EMBODIMENTS

Figure 1:
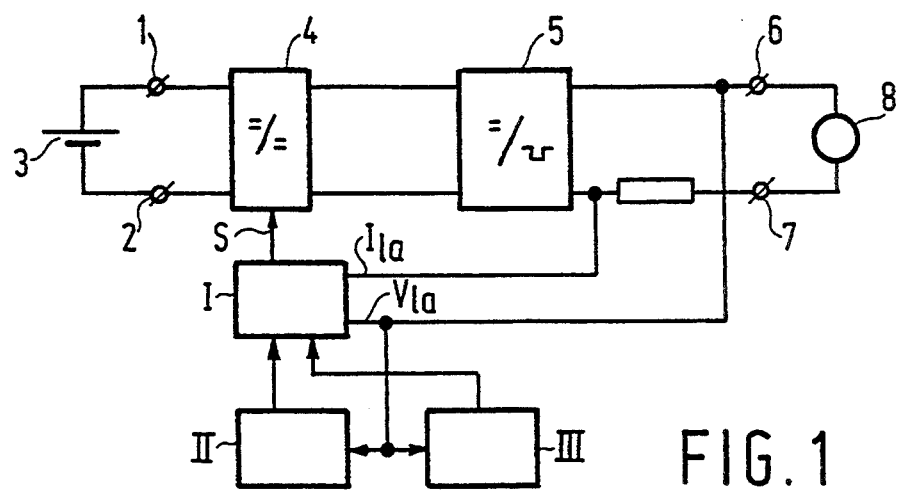
FIG. 1 is a diagram of a circuit arrangement according to the invention.

In FIG. 1, reference numerals 1 and 2 denote terminals for connecting the circuit arrangement to a supply source. In the embodiment shown, a battery 3 acts as the supply source. A static converter 4 is shown, which serves to generate a DC voltage which is subsequently applied to a commutator 5. The commutator 5 is provided with lamp connection terminals 6, 7 between which a high-pressure discharge lamp 8 is connected.

The circuit arrangement is also provided with means A, indicated with I in the Figure, for current stabilization during stable lamp operation by control of the static converter. II denotes means B for operating the lamp at an increased current and increased power on the basis of an instantaneous lamp voltage signal. Finally, III denotes means C which ensure that during the run-up period of the lamp the operation at increased power comprises at least a portion of the run-up period for connection to and transition to nominal operation. During this portion of the run-up period, the means C derives a signal with a falling characteristic and a time constant which is independent of lamp voltage.

Figure 2A:
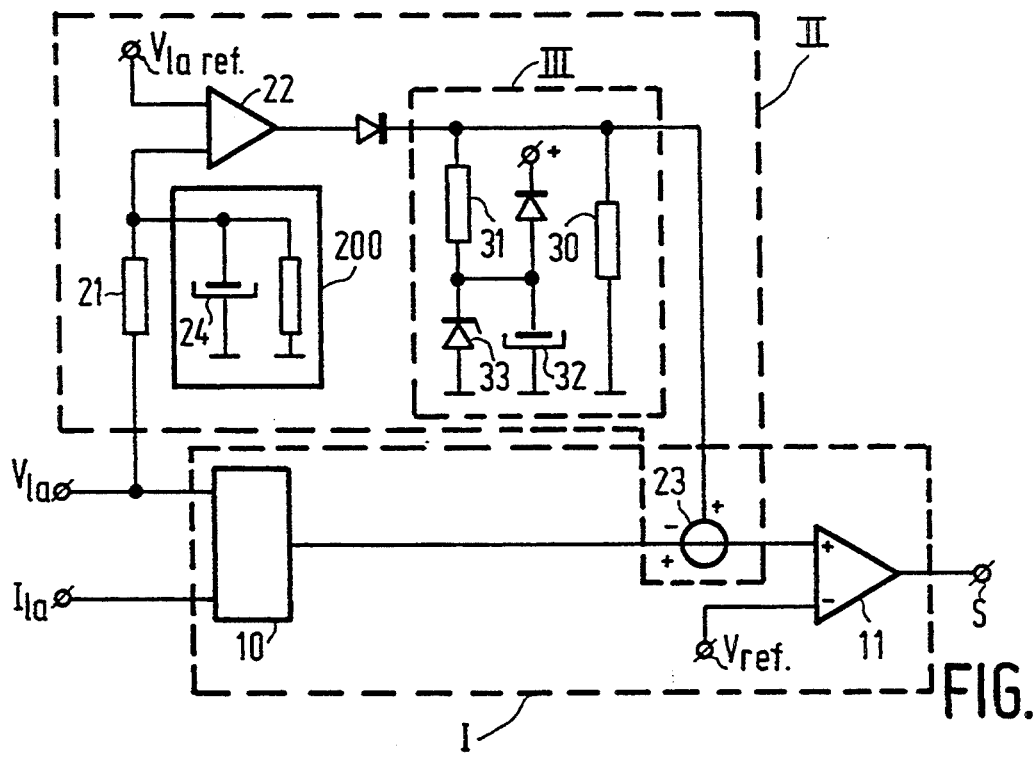
FIG. 2a shows a portion of the circuit arrangement of FIG. 1 in more detail.

A portion of the diagram comprising the means A, B and C of a practical embodiment is depicted in more detail in FIG. 2a. Vla and Ila denote signal connection points of the means A, further denoted I, which receive an instantaneous lamp voltage signal and an instantaneous lamp current signal, respectively. A signal representing an instantaneous lamp power is derived from these signals by means of a combination circuit 10 and subsequently compared with a reference signal $V_{ref}$ at 11, the outcome serving as a control signal S for controlling the static converter.

The signal representing the instantaneous lamp power may be formed in that the signals Vla and Ila are multiplied. This provides an accurate representation of the power, however, it does require a comparatively complicated circuit.

A fair approximation of the lamp power is obtained by summation of the signals Vla and Ila. Such an approach has been found to be very suitable in practice for lamp stabilization control and can be realised, for example, by means of a simple resistance network.

In order for the connected high-pressure discharge lamp to supply a luminous flux of at least 60% of the nominal luminous flux after 1 s, facilities are provided for operating the lamp temporarily with an increased current, called run-up current, and an increased power compared with nominal operation. For this purpose, the lamp voltage signal Vla in the embodiment described is also connected via an impedance 21 to a comparison circuit 22 in which the instantaneous lamp voltage signal is compared with a reference value $Vla_{ref}$. The outcome of this comparison is subsequently subtracted from the signal representing the instantaneous lamp power formed by the combination circuit 10 by means of a summation circuit 23.

The apparatus II is also provided with means D for the automatic adaptation of the run-up of the lamp in the case of ignition after a short interruption. For this purpose, II is provided with a capacitor 24 which, together with the ohmic impedance 21, acts as a low-pass filter during the lamp run-up after ignition in the cold state. The voltage across the capacitor 24, accordingly, accurately follows the change in the lamp voltage signal $V_{la}$ during the run-up.

The capacitor 24 also forms part of a discharge circuit 200 in which the discharge time of the capacitor 24 is a measure of the degree of cooling-down of the connected lamp after the lamp supply has been disconnected.

When the lamp is restarted after a short interruption, on the one hand the voltage across the capacitor 24 will have fallen, while on the other hand the lamp voltage signal $V_{la}$ abruptly rises to a comparatively high value. As a result of the low-pass filter characteristic of the combination of ohmic impedance 21 and capacitor 24, the lamp voltage signal $V_{la}$ causes a comparatively large charging current to flow through the ohmic resistance 21 to the capacitor 24. This means that a reduced voltage as compared with the instantaneous value of the lamp voltage signal $V_{la}$ will be applied to the input of the comparison circuit 22. It is achieved by this that the run-up function is automatically corrected relative to a run-up from the cold state after re-ignition in the case of a short interruption of the voltage supply to the lamp. The signal coming from the comparison circuit 22 is subtracted from the power signal at the circuit 23, after which this power signal is compared with a reference value $V_{ref}$.

According to the invention, means C, indicted with III in the drawing, are also provided such that the operation at the increased power comprises a portion of the run-up period for transition to nominal or normal operation. This portion has a falling characteristic signal with a fixed time constant i.e. a time constant that is independent of the lamp voltage. For this purpose, a timer circuit is included in the embodiment described, formed by resistors 30, 31 and a capacitor 32, which timer circuit is so connected in the circuit that the signal coming from the comparison circuit 22 is blocked the moment it has fallen to a preset threshold value. The timer circuit then supplies a signal which is a function of the discharging current of the relevant capacitor 32 only. It is achieved by this that the control signal applied to the converter (FIG. 1) has a falling characteristic with a fixed time constant. To ensure that the signal determined by the timer circuit is carried during the run-up of the lamp only, i.e. those conditions when considerable light fluctuations are in danger of occurring, charging of the relevant capacitor 32 takes place through the signal coming from the comparison circuit 22. To limit the voltage across capacitor 32, and thus the maximum duration of that portion of the run-up period which produces the signal with the falling characteristic having the fixed time constant, the capacitive means 32 are shunted by zener diode means 33.

Figure 2B:
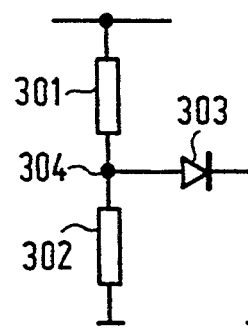
FIGS. 2b and 2c show modifications of a portion of the circuit arrangement of FIG. 2a, FIG. 3 is a graph showing the lamp current and lamp voltage as a function of time for a lamp operated with the circuit arrangement of FIG. 1.

In a modification of the embodiment described, a further improvement is realised in that III is provided with two timer circuits with mutually differing fixed time constants. This is shown in FIG. 2b. Compared with the timer circuit shown in FIG. 2a, the resistor 30 is here replaced by a resistor network formed by resistors 301 and 302 and a diode 303. The one timer circuit with the first fixed time constant is formed by the discharging circuit 32, 31,301,303. When the voltage at point 304 has fallen so far that the voltage across diode 303 is equal to the voltage drop caused by its internal impedance, the second timer circuit with the second fixed time constant becomes active, which timer circuit is formed by the discharging circuit 32, 31,301,302.

Figure 2C:
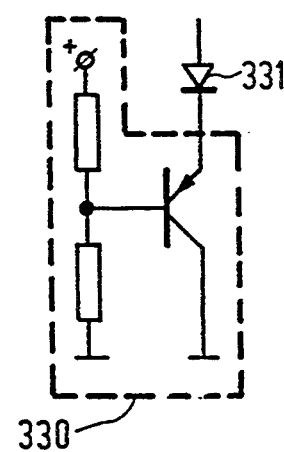

Another modification of the embodiment described is shown in FIG. 2c and comprises, instead of a zener diode 33, a transistor circuit 330 in series with a diode 331 for reducing losses in the circuit arrangement.

Time averaging also takes place in the comparison circuit 22 in the embodiment described for achieving stability of the control circuit. Time averaging also takes place in the comparison step at 11 for forming the control signal S for controlling the static converter.

It is favourable for discharge lamp life to operate the lamp at a negative polarity relative to ground. To form the signal representing the power, a polarity change of Vla is provided in this connection in the embodiment described.

A practical realisation of the circuit arrangement as described with reference to the drawing was used for operating a 35 W high-pressure discharge lamp which contains, in addition to Hg, also Xe and metal halides. The nominal lamp voltage is approximately 90 V and the nominal lamp current approximately 0.4 A. A 12 V battery served as the supply source.

Figure 3:
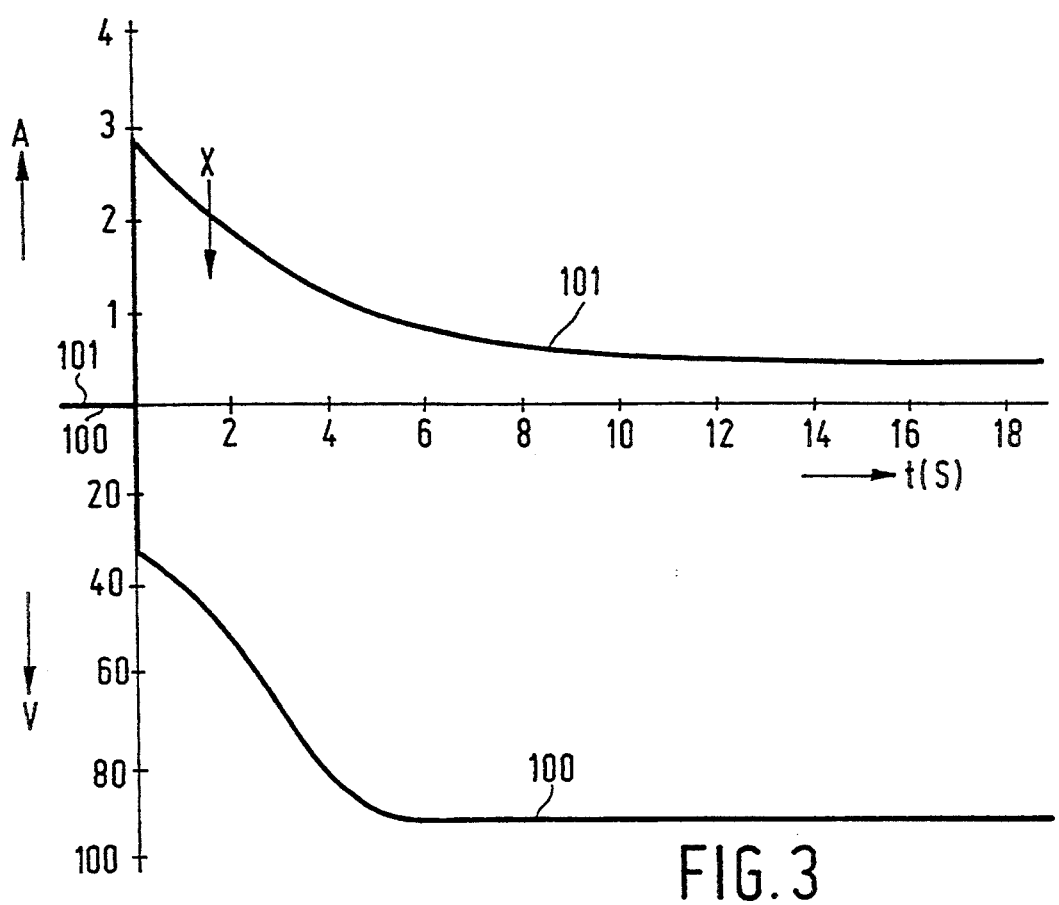

FIG. 3 shows the run-up of the lamp voltage (curve 100) and lamp current (curve 101) upon ignition from the cold state.

Figure 4:
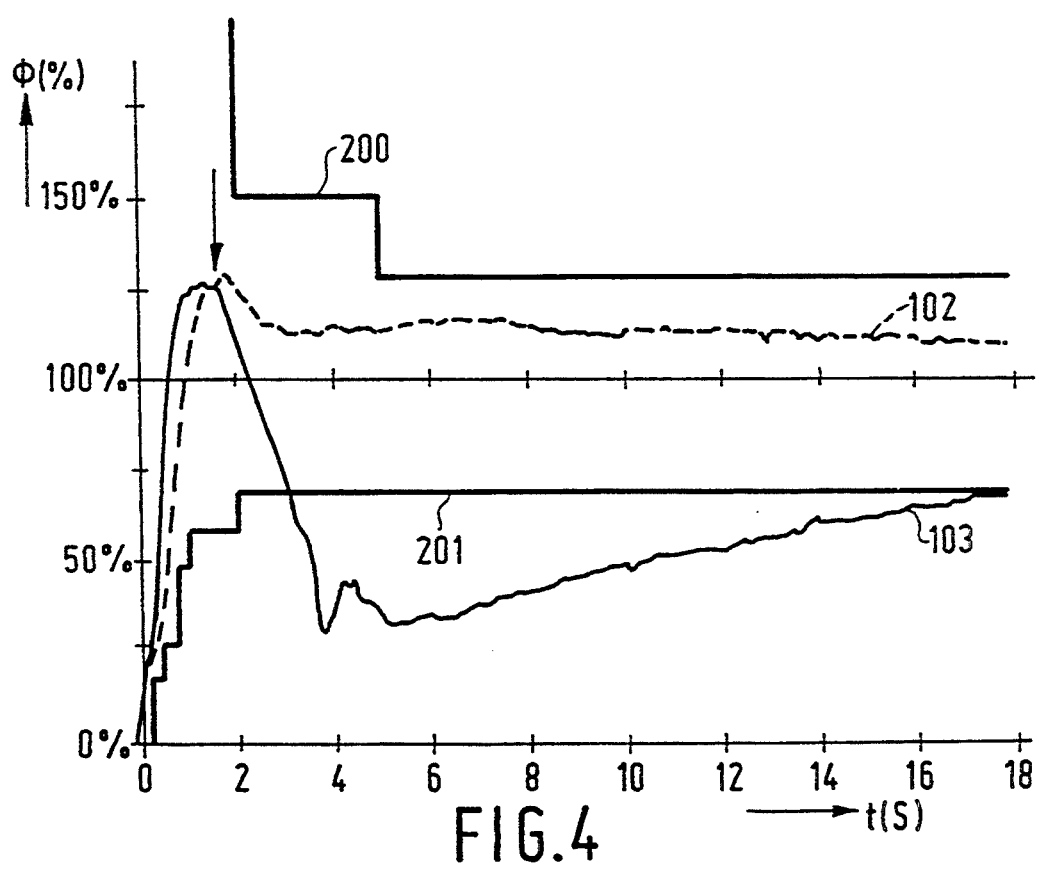
FIG. 4 is a graph showing the luminous flux as a function of time accompanying the lamp current and lamp voltage of FIG. 3.

FIG. 4 shows the measured luminous flux (curve 102) on the same time base as used in FIG. 3. For comparison, a curve 103 in FIG. 4 shows the measured luminous flux in the case in which the circuit arrangement is not provided with means C.

The transition to the falling characteristic with fixed time constant takes place at the moment X.

A comparison of the luminous flux indicated by curve 102 with that indicated by curve 103 makes it clear that after the moment X the luminous flux exhibits a much smaller fluctuation when the lamp is operated with the circuit arrangement according to the invention than when the lamp is operated with a circuit arrangement according to the present state of the art. Curves 200 and 201 in FIG. 4 indicate the maximum and minimum values, respectively, for the luminous flux as allowed by the SAE standard.

We claim:

1. A circuit arrangement for operating a high-pressure discharge lamp, said circuit arrangement comprising:

a static converter for generating a DC voltage, a commutator coupled to the static converter and provided with lamp connection terminals, means A for current stabilization during stable lamp operation by controlling the static converter, means B for operating a discharge lamp when connected to said lamp connection terminals with an increased run-up current and an increased power as compared with nominal operation of the discharge lamp and on the basis of an instantaneous lamp voltage signal such that the discharge lamp supplies a luminous flux of at least 60% of the nominal lamp luminous flux one second after lamp ignition, and transition means C coupled to lamp operating means B such that the operation at the increased power comprises at least a period for transition to power at nominal lamp operation, during which transition period the increased power has a falling characteristic with a time constant that is independent of the lamp voltage of a connected discharge lamp.

2. A circuit arrangement as claimed in claim 1, wherein the transition means C is responsive to a signal at an output of the lamp operating means B so that the transition to the period in which the increased power has the falling characteristic with the lamp voltage independent time constant occurs when the instantaneous lamp voltage of the connected discharge lamp reaches half the nominal lamp voltage value.

3. A circuit arrangement as claimed in claim 1, wherein the transition means C comprise an RC circuit for deriving a fixed time constant as the time constant which is independent of lamp voltage.

4. A circuit arrangement as claimed in claim 1, wherein the current stabilization means A comprises summation means for deriving a control signal for the static converter representing an instantaneous lamp power by summation of a signal representing the instantaneous lamp voltage and a signal representing the instantaneous lamp current of a connected discharge lamp.

5. A circuit arrangement as claimed in claim 1, further comprising correction means D for automatic adaptation of the run-up phase of the connected lamp in the case of lamp ignition after a short power interruption.

6. A power supply apparatus for the ignition and operation of a high-pressure discharge lamp comprising:

an input terminal for connection to a source of supply voltage, an output terminal for connection to a high pressure discharge lamp, a converter for generating D.C. voltage and coupled to said input terminal, a commutator coupled to the converter and to said output terminal, lamp current stabilization means coupled to the converter for control thereof at least during stable operation of a discharge lamp when connected to said output terminal, means for monitoring lamp voltage so as to derive a lamp voltage signal, means responsive to said lamp voltage signal and coupled to said lamp current stabilization means for operating a connected discharge lamp, after ignition, with a high run-up current and a high power relative to the lamp power during normal stable operation of a discharge lamp, and transition means coupled to said lamp operating means so as to provide a transition period in which said high power exhibits a falling characteristic having a time constant that is independent of the lamp voltage of a connected discharge lamp.

7. The power supply apparatus as claimed in claim 6 wherein said transition means is coupled to an output of said lamp operating means so that the transition period begins when the lamp voltage signal indicates a lamp voltage is present which is equal to half the normal rated lamp voltage.

8. The power supply apparatus as claimed in claim 6 wherein said transition means comprise an RC circuit coupled to an output of said lamp operating means so as to provide a fixed time constant as said time constant that is independent of the lamp voltage.

9. The power supply apparatus as claimed in claim 6 wherein said transition means comprise an RC circuit coupled to an output of said lamp operating means so as to provide first and second different fixed time constants which become active at different levels of voltage at the output of said lamp operating means.

10. The power supply apparatus as claimed in claim 6 further comprising means for monitoring lamp current so as to derive a lamp current signal, and wherein said lamp current stabilization means comprises a first circuit for combining said lamp voltage signal and said lamp current signal for deriving a control signal for the converter representing lamp power of a connected discharge lamp.

11. The power supply apparatus as claimed in claim 10 wherein said lamp operating means further comprises a comparator having a first input which receives a reference voltage, a second input which receives said lamp voltage signal, and an output at which a further control signal is produced, and said lamp current stabilization means includes a further circuit for combining an output signal of the first combining circuit with said further control signal to derive said control signal for the converter.

12. The power supply apparatus as claimed in claim 6 further comprising an RC correction circuit responsive to the lamp voltage signal and coupled to said lamp current operating means so as to automatically adjust the run-up period of a connected lamp as a function of the time duration of a power interruption in the power supply apparatus.

13. The power supply apparatus as claimed in claim 6 further comprising means for monitoring lamp current so as to derive a lamp current signal, and wherein said lamp current stabilization means comprises a first circuit for combining said lamp voltage signal and said lamp current signal for deriving a power control signal, said lamp operating means further comprises a comparator having a first input which receives a reference voltage, a second input which receives said lamp voltage signal, and an output at which a power correction signal is produced, and said lamp current stabilization means includes a further circuit for combining said power control signal of the first combining circuit with said power correction signal to derive a control signal for the converter.

14. The power supply apparatus as claimed in claim 13 further comprising:

a rectifier means coupling said output of the comparator to one input of said further combining circuit, and a timing circuit coupled to a junction point between the rectifier means and said one input of the further combining circuit and to a point of reference voltage.

15. The power supply apparatus as claimed in claim 6 wherein said source of supply voltage comprises a DC battery and said lamp voltage signal is derived from a voltage at said output terminal when a discharge lamp is connected thereto and said power supply apparatus is in operation.

16. A circuit arrangement as claimed in claim 3, wherein the current stabilization means A comprises summation means for deriving a control signal for the static converter representing an instantaneous lamp power by summation of a signal representing the instantaneous lamp voltage and a signal representing the instantaneous lamp current of a connected discharge lamp.

17. A circuit arrangement as claimed in claim 16, further comprising correction means D for automatic adaptation of the run-up phase of the connected lamp upon lamp ignition after a short power interruption.

18. A circuit arrangement as claimed in claim 3, further comprising correction means D for automatic adaptation of the run-up phase of the connected lamp upon lamp ignition after a short power interruption.

19. The power supply apparatus as claimed in claim 6 wherein said lamp operating means, during a lamp run-up period, operates a connected discharge lamp so that it supplies, within one second after ignition, a luminous flux of at least 60% of normal stable lamp luminous flux.

* * * * *